United States Patent [19]

Myers

[11] 4,055,931
[45] Nov. 1, 1977

[54] METHOD AND APPARATUS FOR PROVIDING A CONTROLLED ATMOSPHERE AROUND PERISHABLE PRODUCTS

[75] Inventor: Albert H. Myers, Los Gatos, Calif.

[73] Assignee: Furukawa International U.S.A., Inc., San Francisco, Calif.

[21] Appl. No.: 708,853

[22] Filed: July 28, 1976

[51] Int. Cl.² .............................................. B65B 31/08
[52] U.S. Cl. ....................................... 53/22 B; 53/7; 53/79; 53/112 B
[58] Field of Search .................. 53/7, 22 B, 112 B, 79

[56] References Cited

U.S. PATENT DOCUMENTS

| | | | |
|---|---|---|---|
| 2,506,769 | 5/1950 | Bergstein | 53/22 B |
| 3,584,428 | 6/1971 | Falk | 53/22 B |
| 3,939,624 | 2/1976 | Gidewall et al. | 53/112 B |

*Primary Examiner*—Travis S. McGehee
*Attorney, Agent, or Firm*—Patrick F. Bright

[57] ABSTRACT

A perishable product is enclosed within a flexible bag and the air is evacuated from the bag to a predetermined pressure below atmospheric pressure. A predetermined volume of a gas is then introduced into the bag.

14 Claims, 2 Drawing Figures

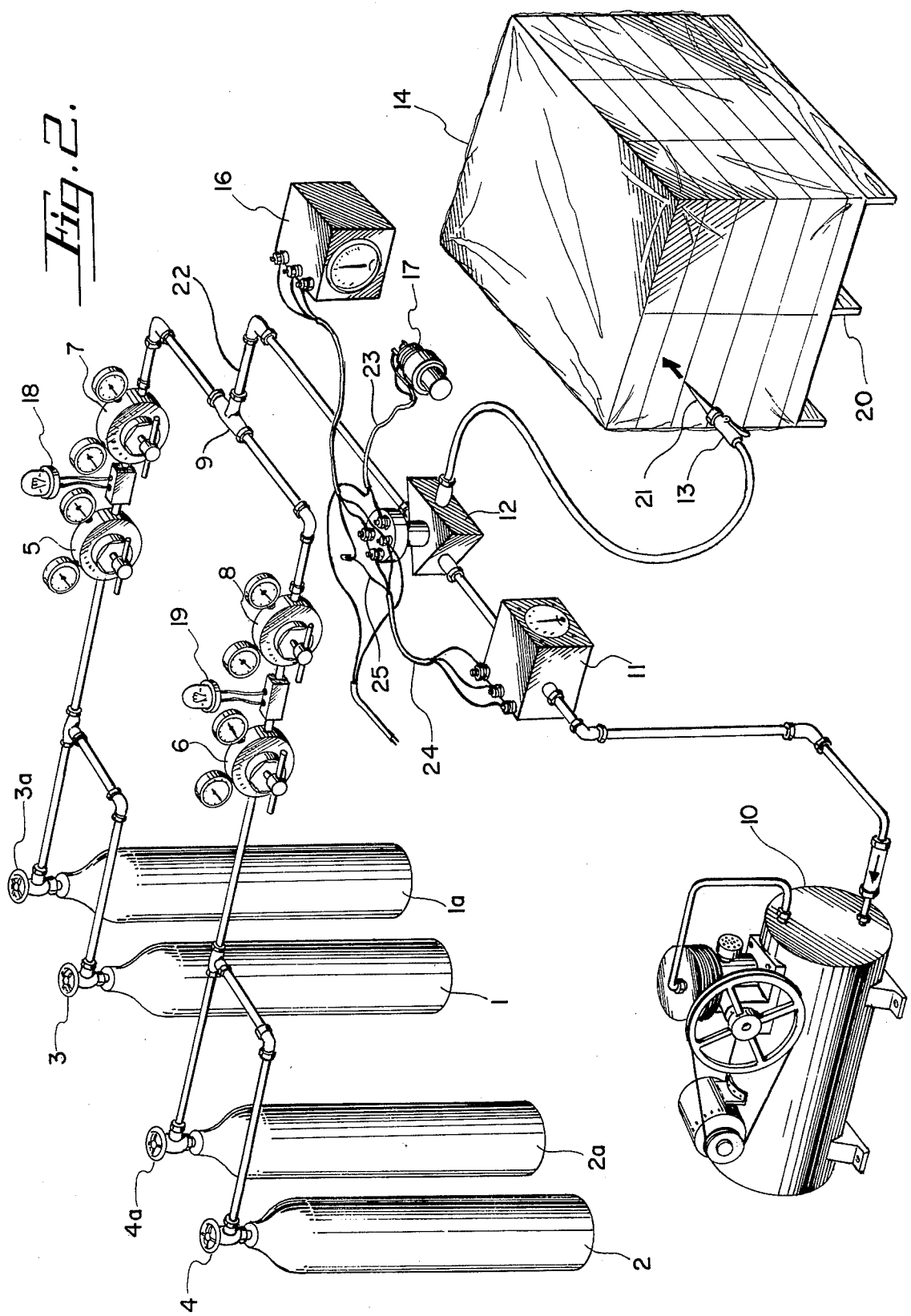

METHOD AND APPARATUS FOR PROVIDING A CONTROLLED ATMOSPHERE AROUND PERISHABLE PRODUCTS

BACKGROUND OF THE INVENTION

1. Field of the Invention

This invention relates to the field of protecting perishable products, in particular agriculture products, for market, and more specifically to a method and apparatus for surrounding agricultural products with a controlled atmosphere.

2. Description of the Prior Art

It is known that the ripening of agricultural products such as strawberries and tomatoes are affected by the atmosphere surrounding the product. It is, of course, desirable to control the ripening of fruits so that they can be delivered to the consumer in a ripe, but not spoiled condition.

Devices are known for storing fruits in a protective atmosphere or for providing a protective atmosphere with trucks and box cars. These devices utilize a purge technique, to replace the air atmosphere within the container with the desired atmosphere. The desired atmosphere flows into the container and the displaced atmosphere is vented out of the container. Thus, there is a continuous mixing and dilution of the atmosphere within the container, until the original air is almost totally expelled.

Because of the mixing of the atmosphere, this known method is costly, is inefficient, is wasteful of the purging gas, and requires a long time to expel the original atmosphere. The time is further increased if the product is packaged in a stack of individual boxes resulting in a labyrinth for the gases to follow. Additionally, differences in temperature of the gas within the container can result in stratification, and can further delay complete protection of the product. Stratification is always a problem when purging, in that the purge gas can pass by the surfaces of the product due to the prior atmosphere forming, with the purge gas, a stratified layer in the container. Higher pressures of purge gas will aid in reducing such stratification, but, especially deep inside a pallet of product containers, the lower velocity of the purge gas is ineffective to eliminate stratification altogether.

It is the gases that are adjacent the surface of the fruit which affect the ripening of the fruit. Some of these gases are held in contact with the fruit by adsorption and absorption of the gas on the fruit's surface. A simple purging of the atmosphere does not repidly remove these localized gases. Thus, the fruit may continue to ripen, because these adhering gases are not adequately removed by the prior art purge technique.

SUMMARY OF THE INVENTION

It is an objective of the invention to provide an improved method and apparatus for enclosing agricultural products in a controlled atmosphere.

It is a further objective of the invention to provide a method and apparatus for rapidly and uniformly surrounding agricultural products with a controlled atmosphere, both efficiently and economically.

It is a further objective of the invention to provide a method and apparatus for removing gas molecules adhering to the surface of agricultural products and replacing such gases with selected gases.

According to the invention, the agricultural product is enclosed within a plastic bag. Air is then evacuated from the bag to a predetermined pressure below atmospheric pressure. A predetermined volume of a gas is then introduced into the bag. This procedure serves to remove the gas molecule from the surface of the product and, since prior atmospheric gases are removed before refill, there are no problems associated with stratification. Thus, reducing the total volume in the confinement by providing an initial negative pressure as a baseline to control percent by volume of the fill gas, quicker and better diffusion results, and a more precise volumetric control of the fill gas is possible.

BRIEF DESCRIPTION OF THE DRAWINGS

The invention will now be described in detail with reference to the accompanying drawings representing preferred embodiments of method and apparatus according to the present invention. In the drawing:

FIG. 2 is a schematic of the invention.

DESCRIPTION OF THE PREFERRED EMBODIMENTS

Figure 1:
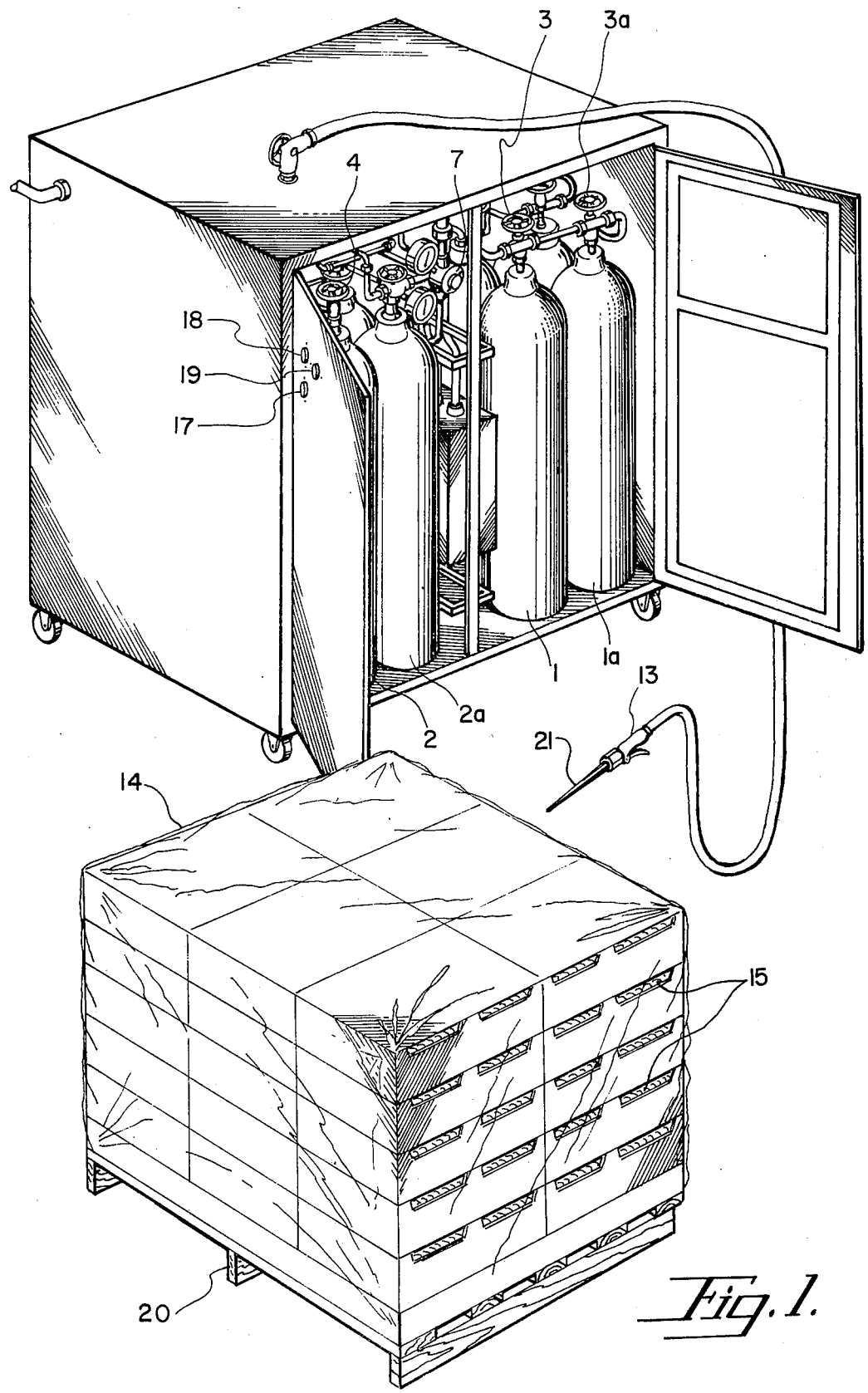
FIG. 1 is a perspective view of the apparatus of the invention.

FIG. 1 shows the apparatus as it is used to provide a controlled atmosphere around fruit 15 enclosed within a plastic bag 14 and stacked on a pallet 20.

FIG. 2 schematically showing the connection of the parts shown in FIG. 1. A hollow probe 21 is used to pierce the plastic bag 14. In a preferred embodiment, polyethylene has proven to be a satisfactory bag material.

A flexible hose connects the probe handle 13 with a threeposition, step solenoid-operated valve 12. In one position, the valve 12 is open to a line leading to a vacuum source such as vacuum pump 10. In another position the valve 12 is open to a source of gas such as gas bottles 1 and 2. In a third position the valve 12 is closed.

The gas source may consist of bottles of different gases which are desired to surround the fruit, for example a bottle 1 of $CO_2$ and a bottle 2 of $N_2$. Tank pressures for the two gases are typically 2000 psi for $N_2$ and 600 to 800 psi for $CO_2$. High pressure regulators 5, 6 are used to reduce the pressures in the lines from both bottles to an equal and lower pressure such as 130 pounds per square inch. Low pressure regulators 7, 8 then reduce the pressure to the desired final pressure, generally within 20–25 pounds per square inch. The final pressure for each gas will depend upon the percent of that gas desired in the final mixture. Because the low pressure regulators 7, 8 are fed by a uniform gas pressure coming from a much higher pressure, the final delivered pressure can be quite accurately set regardless of the flow rate.

The two gases are joined by a T-junction 9 to a single line 22, so that a proper mixture of gases can be delivered to valve 12. Low pressure indicators 18, 19 are coupled to the gas lines between the high pressure and low pressure regulators. These indicators turn on a red light when the pressure drops below a predetermined value, thus signaling the need to switch to a reverse bottle of gas 1a, 2a using shut-off valves 3, 3a, 4, 4a.

In use, an operator punches the probe 21 into the flexible bag 14. He then pushes start button 17 which turns the solenoid operated valve 12, over line 23, from the closed position to the vacuum position. Air is then pulled from around the fruit and the flexible bag 14 collapses against the containers. At the given pressure, generally less than 65 inches of water, (for example, 55 inches of water for strawberries) pressure sensor 11 automatically actuates valve 12, over line 24, to the gas position, while simultaneously sending a start signal to timer 16 over line 25. The gases then flow into the plastic bag 14 through valve 12. Electrical timer 16 is connected to the valve 12 to turn it to the off position after a given length of time. Since the pressure of the gas to the bag 14 is closely set by low pressure regulators 7, 8, the volume of gas introduced into the bag can be accurately predetermined by setting the timer 16 to a predetermined time.

The operator then removes the probe from the bag and seals the hole. The machine is then ready to repeat a cycle for the next pallet. A complete cycle can be run in approximately 30 seconds.

The flexibility of bag 14 helps compensate for differences in volume of fruit within the bag. When the bag is being evacuated, the bag collapses into any open spaces. When it is being filled, it expands outwardly.

In a preferred embodiment, excess plastic bag is provided at the top of the load. This prevents any tearing of the bag by excess pressure, since the flexible bag wall cannot support a high pressure differential.

The predetermined volume of fill gas that is used is based upon the size of the package to be filled and the predetermined vaccum pressure selected. In a preferred embodiment of the invention, the amount of fill gas used is such as to return the internal pressure of the package to near atmospheric pressure. This is desirable so that a small rip or leak in the bag will not result in any seepage of gas into or out of the bag during storage or shipping of the product.

From the foregoing, it can be realized that the invention can assume various embodiments. Thus, it is to be understood that the invention is not limited to the specific embodiments described herein, but is to be limited only by the appended claims.

What is claimed is:

1. A method for protecting perishable products comprising the steps of:
   sealing the product within an air-tight flexible bag;
   inserting into said bag a probe connected to a multi-position valve;
   moving said valve to a first position which connects said probe to a vacuum pump;
   evacuating air from said bag to a predetermined pressure below atmospheric pressure;
   moving said valve to a second position which connects said probe to a source of said gas;
   introducing a predetermined volume of gas into said bag by flowing a gas at a predetermined pressure into said bag for a predetermined time;
   moving said valve to a third position which closes the source of gas and vacuum to said probe; and
   withdrawing said probe from said bag.

2. The method as claimed in claim 1, wherein the product comprises a pallet load and said enclosing step comprises enclosing the pallet load within said flexible bag.

3. The method as claimed in claim 1, wherein said predetermined pressure below atmospheric pressure is a pressure less than 65 inches of water.

4. The method as claimed in claim 1, wherein said gas is $CO_2$.

5. The method as claimed in claim 1, wherein said gas is a mixture of $CO_2$ and $N_2$.

6. The method as claimed in claim 1, including the step of resealing said bag after withdrawal of said probe.

7. The method as claimed in claim 1, wherein said predetermined volume of gas is substantially equal to the volume of air removed by said evacuating step.

8. An apparatus for protecting perishable products comprising:
   a flexible bag for enclosing the product;
   a probe for insertion into said bag after said bag is sealed;
   a hose connecting said probe to a multi-position valve;
   means for evacuating including a vaccum pump connected to said valve and open to said probe in one position of said valve for evacuating the air from within said bag to a predetermined pressure below atmospheric pressure; and
   means for introducing a gas including a source of gas at a predetermined pressure connected to said valve and open to said probe in another position of said valve, and timer means connected to said valve for controlling the length of time said valve is in said other position for introducing a predetermined volume of gas into said bag.

9. The apparatus as claimed in claim 8, wherein said bag comprises a polyethylene bag.

10. The apparatus as claimed in claim 8, wherein said valve comprises a three-way solenoid operated valve, the third position being an off position.

11. The apparatus as claimed in claim 8, wherein said means for introducing gas includes a timer coupled to said solenoid operated valve, and said means for evacuating includes a pressure sensor coupled to said timer and to said solenoid operated valve, said sensor including means for sending a signal to move said valve from said one position to said another position and for sending a start signal to said timer upon the sensing of said predetermined pressure, said timer effective to terminate the introduction of said gas at the end of a predetermined time by shutting off said valve.

12. The apparatus as claimed in claim 8, wherein said source of gas comprises:
   a bottle of pressurized gas; and
   a pressure regulator means for supplying gas at a constant pressure from said bottle to said multi-position valve.

13. The apparatus as claimed in claim 12, wherein said source of gas includes:
   an additional bottle of a different pressuized gas; and
   an additional pressure regulator means coupled to said multi-position valve, whereby said predetermined volume of gas comprises a mixture of gases.

14. The apparatus as claimed in claim 12, wherein said source of gas includes a reserve bottle of gas and said regulator means includes a pressure indicator for indicating when said reserve bottle of gas is needed.

* * * * *